US011480107B2

(12) United States Patent
Jacon et al.

(10) Patent No.: US 11,480,107 B2
(45) Date of Patent: Oct. 25, 2022

(54) FIRE RESISTANCE DEVICE INTENDED TO BE INTERPOSED BETWEEN AN UPSTREAM END OF AN AIRCRAFT TURBINE ENGINE MOUNTING STRUCTURE AND A COWLING OF THE TURBINE ENGINE DELIMITING AN INTER-FLOW COMPARTMENT

(71) Applicant: SAFRAN AIRCRAFT ENGINES, Paris (FR)

(72) Inventors: Bruno Alexandre Didier Jacon, Moissy-Cramayel (FR); Baghdad Achbari, Moissy-Cramayel (FR); Thomas Claude Broage, Moissy-Cramayel (FR); Hervé Simonotti, Moissy-Cramayel (FR); Soufien Akachkachy, Moissy-Cramayel (FR); Charles Maurice Jean-Louis Cheret, Moissy-Cramayel (FR); Joseph Taglialavore, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 162 days.

(21) Appl. No.: 16/970,035

(22) PCT Filed: Feb. 14, 2019

(86) PCT No.: PCT/FR2019/050334
§ 371 (c)(1),
(2) Date: Aug. 14, 2020

(87) PCT Pub. No.: WO2019/158867
PCT Pub. Date: Aug. 22, 2019

(65) Prior Publication Data
US 2021/0095569 A1    Apr. 1, 2021

(30) Foreign Application Priority Data

Feb. 16, 2018    (FR) ...................................... 1851349

(51) Int. Cl.
*F02C 7/25*    (2006.01)
*F02C 7/28*    (2006.01)
(Continued)

(52) U.S. Cl.
CPC ................ *F02C 7/25* (2013.01); *F01D 9/065* (2013.01); *F01D 25/162* (2013.01); *F02C 7/28* (2013.01);
(Continued)

(58) Field of Classification Search
CPC ...... F02C 7/25; F02C 7/28; F02K 1/80; F02K 1/805; F02K 3/06; F01D 9/065
See application file for complete search history.

(56) References Cited

U.S. PATENT DOCUMENTS

2008/0053107 A1\*  3/2008  Weaver ..................... F02C 7/28
                                                  415/138
2015/0226130 A1\*  8/2015  Salamon .................. F02C 7/28
                                                  415/208.1

FOREIGN PATENT DOCUMENTS

FR    2920215 A1    2/2009

OTHER PUBLICATIONS

Search Report issued in French Patent Application No. 1851349 dated Oct. 12, 2018.
(Continued)

*Primary Examiner* — Andrew H Nguyen
(74) *Attorney, Agent, or Firm* — Pearne & Gordon LLP

(57) ABSTRACT

A fire resistance device is intended to be interposed between an upstream end of an aircraft turbine engine mounting structure and a cowling of the turbine engine delimiting an inter-flow compartment.

18 Claims, 11 Drawing Sheets

(51) Int. Cl.
*F01D 9/06* (2006.01)
*F01D 25/16* (2006.01)
*F02K 1/80* (2006.01)
*F02K 3/06* (2006.01)

(52) U.S. Cl.
CPC .............. *F02K 1/80* (2013.01); *F02K 1/805* (2013.01); *F02K 3/06* (2013.01); *F05D 2220/323* (2013.01); *F05D 2230/60* (2013.01); *F05D 2240/55* (2013.01); *F05D 2260/30* (2013.01)

(56) References Cited

OTHER PUBLICATIONS

International Search Report for issued in Application No. PCT/FR2019/050334 dated Jun. 11, 2019.
Written Opinion for PCT/FR2019/050334 dated dated Jun. 11, 2019.
Application document as-filed for US patent application entitled: Outer Shroud of an Intermediate Casing for a Dual Flow Turbine Engine for an Aircraft, Comprising Improved Air-Sealing and Fire-Resistance Devices, U.S. Appl. No. 16/969,228, filed Aug. 12, 2020.

* cited by examiner

FIRE RESISTANCE DEVICE INTENDED TO BE INTERPOSED BETWEEN AN UPSTREAM END OF AN AIRCRAFT TURBINE ENGINE MOUNTING STRUCTURE AND A COWLING OF THE TURBINE ENGINE DELIMITING AN INTER-FLOW COMPARTMENT

This is the National Stage of PCT international application PCT/FR2019/050334, filed on Feb. 14, 2019 entitled "FIRE RESISTANCE DEVICE INTENDED TO BE INTERPOSED BETWEEN AN UPSTREAM END OF AN AIRCRAFT TURBINE ENGINE MOUNTING STRUCTURE AND A COWLING OF THE TURBINE ENGINE DELIMITING AN INTER-FLOW COMPARTMENT", which claims the priority of French Patent Application No. 1851349 filed Feb. 16, 2018, both of which are incorporated herein by reference in their entirety.

TECHNICAL FIELD

The invention relates to the fire resistance function between an inter-flow compartment of a dual flow turbine engine for an aircraft and a zone upstream from the mounting structure of this turbine engine. In particular, it aims to prevent a fire initiated in the inter-flow compartment from propagating in the zone upstream from the mounting structure.

The invention is applicable to all types of dual flow turbine engines, and particularly to a turbojet.

STATE OF PRIOR ART

In a dual flow turbine engine for an aircraft, there are usually one or several arms that pass radially through the fan flow stream, downstream from the fan. This arm is typically arranged so as to connect a fan compartment located around the outer shroud of an intermediate casing, to an inter-flow compartment. Conventionally, these two compartments house equipment and auxiliaries, while the arm interposed between the two provides the passage for different elements such as electrical cables, and/or fluid pipes.

The radially internal end of such an arm is connected to an upstream ring, partly delimiting the inter-flow compartment radially outwards. This ring thus forms the upstream end of the set of cowlings forming the external envelope of the inter-flow compartment. It is planned to intercalate two connection cowlings between the arm and the upstream ring, laterally on each side of an upstream end of the mounting structure, to make the junction between the arm and the upstream ring.

The mounting structure that is used to fix the turbine engine onto an aircraft wing element, can have an upstream end close to the junction between the arm passing through the fan flow stream and the upstream ring of the inter-flow compartment. The problem of the fire resistance function then arises, because it is required to prevent the propagation of a flame initiating in the inter-flow compartment, particularly to prevent this flame from reaching the zone upstream from the mounting structure located nearby.

Consequently, there is a need to create a fire resistance device with a design that guarantees the required function, enables easy integration into the dense and complex environment of the zone concerned, and facilitates fabrication.

SUMMARY OF THE INVENTION

To at least partially satisfy this need, the first purpose of the invention is a fire resistance device according to the characteristics in claim 1.

The invention is thus advantageous in that it discloses a particularly effective fire resistance device that integrates perfectly into its environment, and the single-piece nature of which is such that it is particularly easy and inexpensive to manufacture, particularly with regard to the required tooling.

The single-piece aspect is possible due to the simple geometry of the device according to the invention, particularly by the use of contact lips. Furthermore, these do not require the use of an insert during manufacturing of the device, unlike for example the use of hollow contact zones, called bead or moulding contact zones. Furthermore, a lip is usually easily deformable, such that there is no need to subject it to a specific prestressing operation after assembly. The deformation required to guarantee its fire barrier function can simply be the result of bearing of a surrounding element, for example such as bearing of a pod mobile cover seal designed to be compressed in the zone.

Finally, note that with its two contact lips, the fire resistance device according to the invention can form two distinct and substantially contiguous physical barriers. One is designed to stop a fire in the inter-flow compartment so that it does not propagate circumferentially towards the lateral face of the mounting structure nor radially towards an end face of this mounting structure, and the other is designed such that this fire will not propagate axially in the downstream direction, along this same lateral face of the mounting structure.

The invention preferably includes at least one of the following optional technical characteristics, taken in isolation or in combination.

Preferably, said second line is straight, and preferably substantially orthogonal to a first substantially plane contact surface in which the first curved line is inscribed. Nevertheless, other forms of line and other inclinations can be used depending on the bearing surfaces to be brought into contact, without going outside the framework of the invention.

Preferably, the first contact lip defines a first general lip direction inclined from the normal to the first contact surface between a base of the first contact lip and the first contact end, and/or the second contact lip defines a second general lip direction inclined from the normal to a bearing surface of this second lip, between a base of the second contact lip and the second contact end. Due to these inclinations, compression of the lips is facilitated, particularly during relative movements that occur in flight between the turbine engine and its mounting structure. This principle is also applicable when the first and second contact elements are in a form other than a lip.

Preferably, the first support portion is in the general shape of an angle.

Preferably, the device also comprises an attachment portion extending from the first support position, said attachment portion preferably containing through holes for the passage of attachment elements.

Preferably, the second support portion carries elongated attachment elements, opposite the second contact element and its second junction zone. These elongated attachment elements can then easily cooperate with the connection cowling, for better retention on this cowling.

Preferably, the device is formed by the superposition of at least one layer of elastomer material, preferably a silicone elastomer, and at least one fibrous layer, preferably made of ceramic, glass or meta-aramid (poly(m-phenylene isophthalamide)). Nevertheless, other types of layers are possible without going outside the scope of the invention. It will be noted that a ceramic fabric layer is particularly efficient for the fire resistance function, while a glass fibre layer can stiffen the stack and limit creep of the silicone elastomer in the plane orthogonal to the superposition direction of the layers, if a mechanical stress is applied along this direction. Finally, such stiffening can also be achieved using a layer of meta-aramid fibres.

Preferably, one or several fibrous layers extend over the entire length of the first contact element, and one or several fibrous layers extend along the entire length of the second contact element.

Another purpose of the invention is a propulsion unit for an aircraft comprising a dual flow turbine engine for an aircraft, and a turbine machine attachment mounting for use in fastening it to a wing element of the aircraft, the turbine engine comprising an inter-flow compartment formed between a core engine flow and a fan flow of the turbine engine, and an arm passing radially through a fan flow, and communicating with the inter-flow compartment that is partly delimited radially outwards by an upstream ring connected to the arm by means of two connection cowlings arranged with one on each side of the upstream end of the mounting structure, along a transverse direction of the propulsion assembly, the upstream end of the mounting structure comprising two lateral faces, and a peripheral bearing surface along the contour of a base of this upstream end of the mounting structure.

According to the invention, the propulsion assembly also comprises a fire resistance device as described above associated with each connection cowling, interposed between the upstream end of the mounting structure and the connection cowling to which the device is fixed.

Preferably, the first contact end of the first contact element bears on the peripheral bearing surface of the upstream end of the mounting structure, and the second contact end of the second contact element bears on the corresponding lateral face of the upstream end of the mounting structure.

Preferably, the first curved line is inscribed in a first approximately plane contact surface substantially parallel to the transverse direction, and to a longitudinal direction of the assembly, and the second line defined by the second contact element is a straight line extending approximately parallel to a vertical direction of the assembly.

Finally, the second contact element is preferably constrained between the lateral face of the upstream end of the mounting structure, and a pod mobile cover seal.

Another purpose of the invention is a method of manufacturing a fire resistance device like that described above, used such that the device is made in a single-piece, and is preferably moulded.

Other advantages and characteristics of the invention will become clear after reading the following detailed non-limitative description.

BRIEF DESCRIPTION OF THE DRAWINGS

This description will be made with reference to the appended drawings among which.

DETAILED PRESENTATION OF PREFERRED EMBODIMENTS

Figure 1:
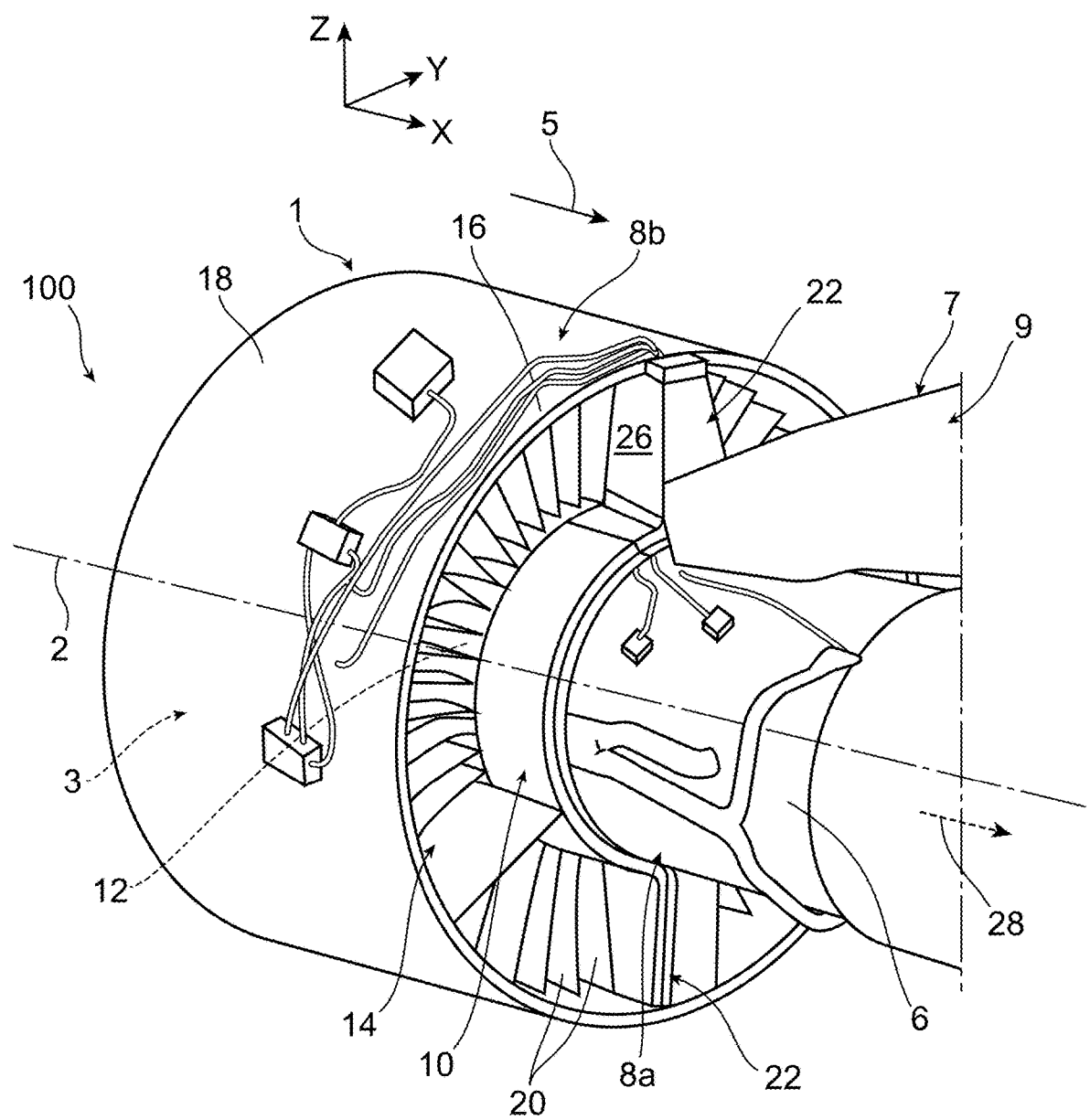
FIG. 1 is a perspective view of a propulsion assembly according to a preferred embodiment of the invention.

Firstly with reference to FIG. 1, the figure shows a propulsion assembly 100 according to a preferred embodiment of the invention. This assembly 100 comprises a dual flow turbine engine 1 for an aircraft, and a mounting structure 9 for this turbine engine on a wing element of the aircraft (not represented).

The propulsion assembly 100 has a longitudinal direction X, also corresponding to the longitudinal direction of the turbine engine 1 and to the longitudinal direction of the mounting structure 9. The assembly 100 also has a transverse direction Y, and a vertical direction Z, corresponding to the direction of the height. The three directions X, Y and Z are orthogonal to each other and form a right-handed trihedron.

Preferably, the mounting structure 9 is used to suspend the turbine engine 1 under a wing of the aircraft. This mounting structure comprises a structural part that will resist forces from the turbine engine, this part normally being called the primary structure or rigid structure. It is generally in the form of a caisson, of which only an upstream end 7 is represented on FIG. 1. The mounting structure is also equipped with secondary structures (not represented) in the form of aerodynamic fairing.

In the preferred embodiment described and represented, the turbine engine 1 is a twin-spool dual flow turbojet. The turbojet 1 has a longitudinal central axis 2 parallel to the X direction, around which its different components extend. It comprises, from upstream to downstream along a principal direction 5 of the gas flow through this turbine engine, a fan 3 then a gas generator conventionally composed of compressors, a combustion chamber and turbines. These elements of the gas generator are surrounded by a central casing 6, also called the "core" casing that radially delimits the interior of an inter-flow compartment 8*a*. This compartment 8*a* is delimited radially outwards by one or several cowlings, including an upstream ring 10 that is the only one shown on FIG. 1. The upstream ring 10 is formed in the downstream continuity of a hub 12 of an intermediate casing 14 of the turbojet. The intermediate casing 14 also comprises an outer shroud 16 located in the downstream continuity of a fan casing 18. It also comprises outlet guide vanes 20, formed downstream from the fan blades and connecting the hub 12 to the outershroud 16.

The fan casing 18 and the outer shroud 16 together delimit a fan compartment 8b, in the radially inwards direction. This compartment 8b is also delimited in the radial outwards direction by one or several cowlings (not represented), forming part of a pod of the turbojet. Like the inter-flow compartment 8a, this compartment 8b houses equipment and auxiliaries, as is widely known in prior art.

One or several arms 22 is/are provided to connect the two compartments 8a 8b. For example, it can be two arms 22 installed on the turbojet, arranged in the 12 o'clock and 6 o'clock positions respectively. These arms 22 are hollow, and are used for example to circulate electrical cables and/or fluid pipes. More precisely, these arms connect a downstream part of the outer shroud 16, to the upstream ring 10. To achieve this, they pass through a fan flow stream 26 of the turbojet, this flow stream being partly delimited in the outwards direction by the shroud 16 and by the cowlings (not represented) located downstream from the shroud, and partly delimited in the inwards direction by the upstream ring 10 of the inter-flow compartment 8a. The fan flow stream 26 is additional to a core engine flow stream 28, that passes conventionally through the gas generator.

With reference to FIGS. 2 to 5, the figures represent a part of the propulsion assembly 100 including the upstream end 7 of the mounting structure 9, the arm 22 located in the 12 o'clock position, and the upstream ring 10. More precisely, on each side of the upstream end 7 of the mounting structure 9, along the Y direction, there are two connection cowlings 30 making the aerodynamic junction between the arm 22 and the upstream ring 10. The latter is thus not completely closed over 360°, but has an angular opening centred on the 12 o'clock position, at which the two connection cowlings 30 make the junction with the radially internal end of the arm 22.

On the figures, the assembly between the different elements is only represented for one side of the mounting structure, but it is understood that there is an identical or similar and preferably symmetric structure on the other side of the upstream end 7 of the mounting structure. Thus, on each side of the mounting structure 9, the connection cowling 30 has an upstream end 32 that will be located in the downstream continuity of the hub of the intermediate casing. Its top end 33 is connected to a wall of the arm 22, whereas its circumferential end 35 is connected to a circumferential end of the upstream ring 10. Finally, its downstream end 38 forms an angular sector groove type housing 38, housing a pod seal 40 that is preferably supported by a mobile pod cover (not shown on FIGS. 2 to 5). This seal 40, also called a three-arm or tripod seal, comprises a node from which a first seal portion 40a extends being compressed in the housing 39 then on the upstream ring 10, a second seal portion 40b being compressed in the housing 39 then on the arm 22, and a third seal portion 40c being compressed on a lateral face 42 of the mounting structure. Each arm of the seal 40 is of the tubular, bead or moulding type.

Figure 3:
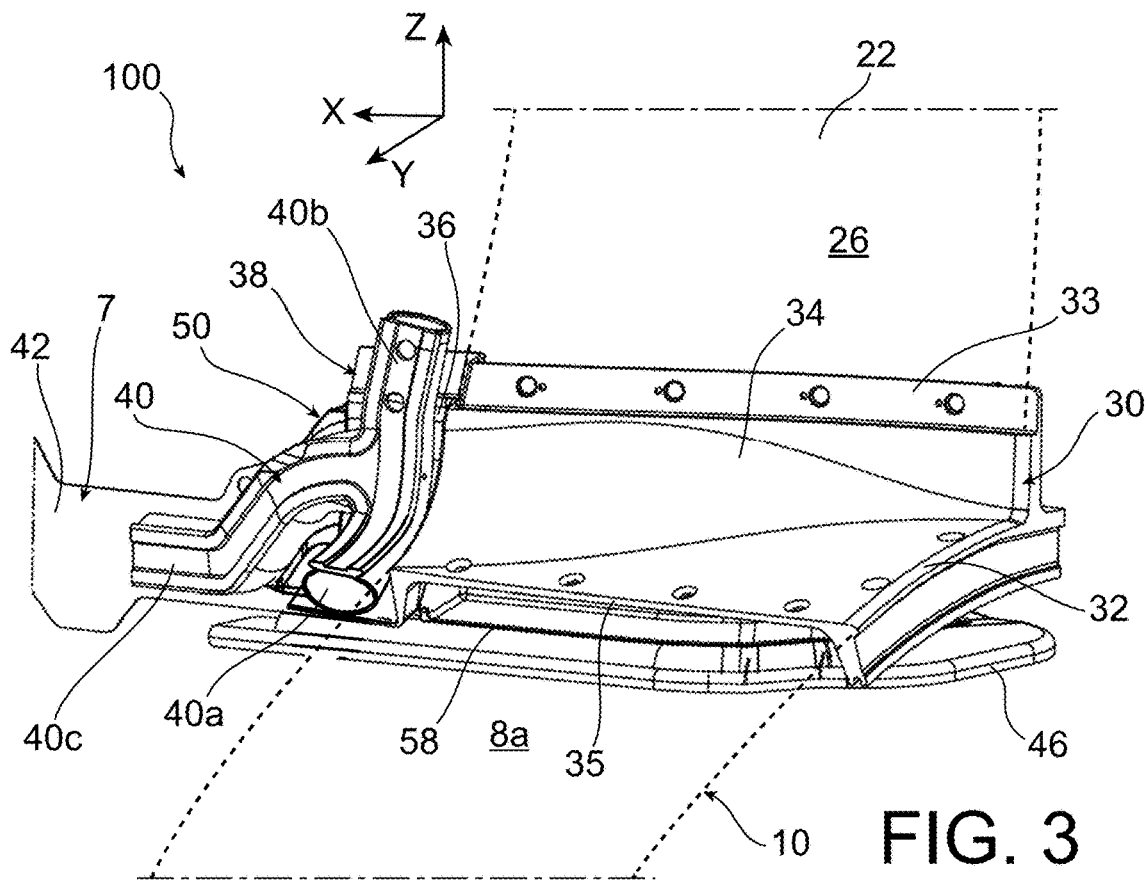
FIG. 3 represents a perspective view of the part shown on the preceding figure.
Figure 4:
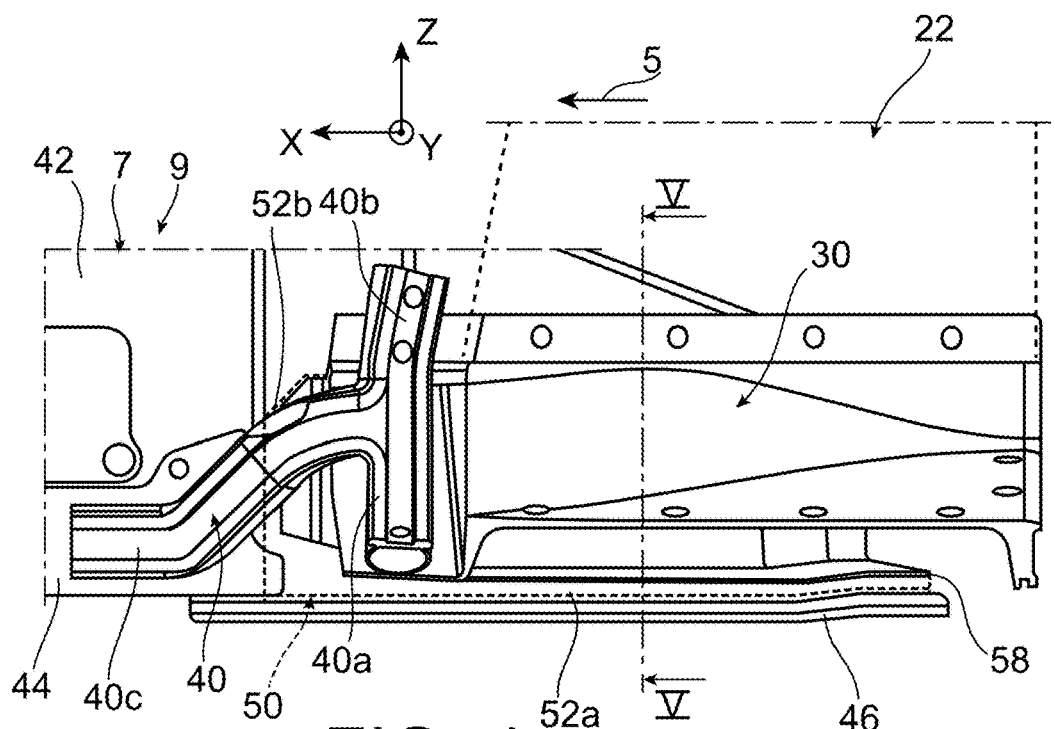
FIG. 4 is an elevation view of the view shown on the preceding figure, with the fire resistance device represented in dashed lines.

The seal 40 thus adopts its position shown in FIG. 3 after the mobile pod cover on which it is installed is closed, this cover then having an external surface that is continuous in the downstream direction with an external surface 34 of the connection cowling 30.

Figure 2:
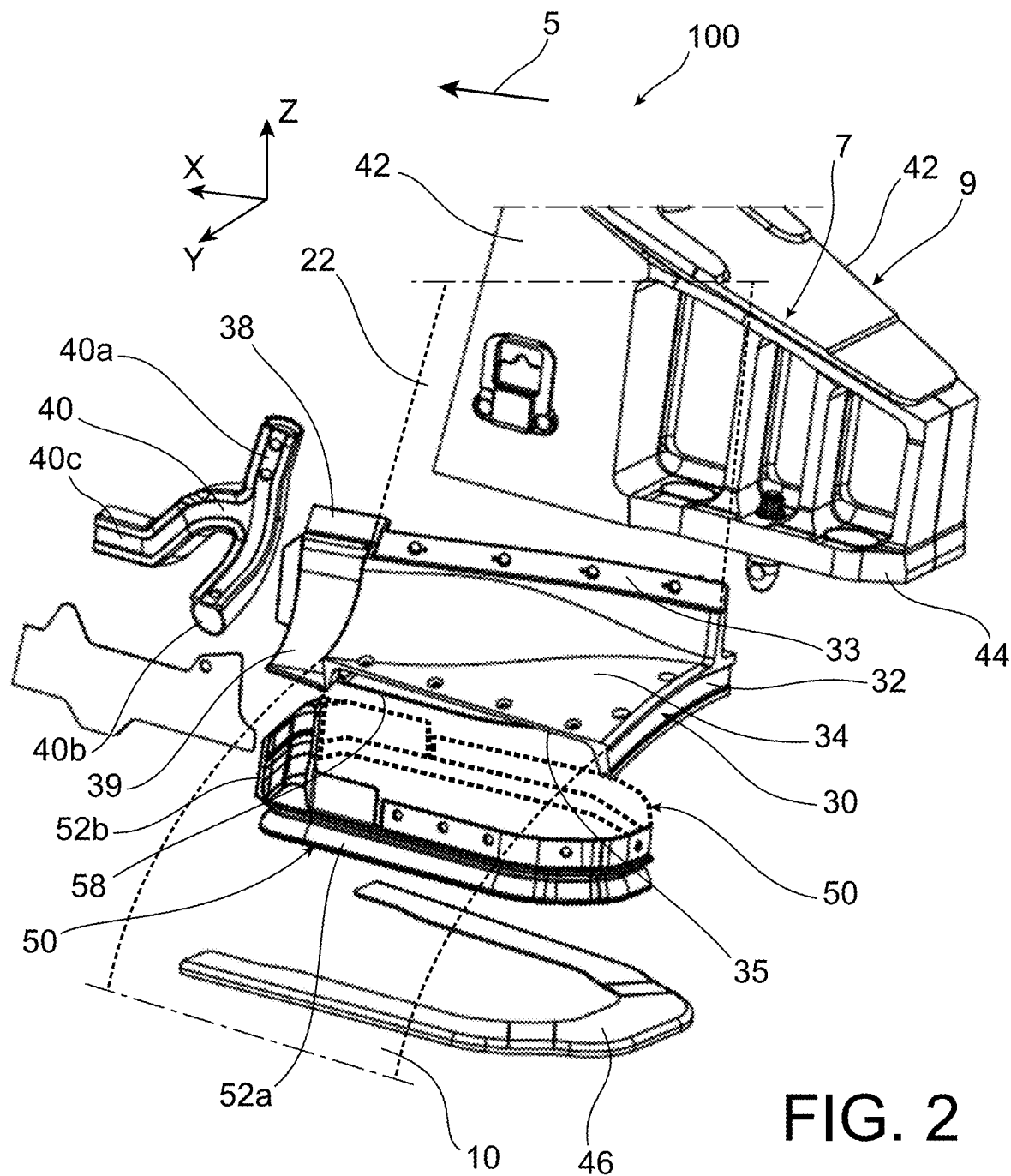
FIG. 2 represents an exploded perspective view of part of the propulsion assembly shown on FIG. 1.

The upstream end 7 of the mounting structure 9 has a base 44, starting from which in particular the two lateral faces 42 extend. The base 44 is fixed to a peripheral contact surface 46 with a generally U shape, along the contour of this base 44. It is substantially plane, parallel to the X and Y directions. Its function lies essentially in setting up a fire resistance barrier between the inter-flow compartment 8a, and the upstream end 7 of the mounting structure. To satisfy this function, the assembly 100 comprises a fire resistance device 50 specific to the invention, associated with each connection cowling 30. In this regard, only one of the two connection cowlings 30 will be described in the following description, it being understood that the two cowlings may have identical or similar designs, for example being designed to be symmetric about a longitudinal XZ plane passing through the axis 2. This configuration is represented diagrammatically on FIG. 2, showing the association of the two devices 50 that join together at their upstream end to jointly define a profile similar to the profile of the peripheral bearing surface 46 against which they are compressed.

The fire resistance device 50 is thus interposed between the upstream end 7 of the mounting structure, and its associated connection cowling 30 onto which this same device is fixed. In general, the device 50 has a first contact element, in this case a first contact lip 52a, and a second contact element, in this case a second contact lip 52b, the first lip 52a bearing in contact with a radially external surface of the peripheral bearing surface 46, on a half-portion of this bearing surface. This first contact lip 52a is such that a fire that is declared in the inter-flow compartment 8a does not propagate circumferentially to the lateral face 42 of the mounting structure, nor radially outwards towards an upstream end face of this mounting structure.

The second contact lip 52b bears on the lateral face 42 of the mounting structure, downstream from the two portions 40a, 40b of the pod seal 40. It is designed to stop a fire in the inter-flow compartment 8a so that it does not propagate downstream in the axial direction, along the lateral face 42 of the mounting structure.

With its lips, the device 50 provides an ingenious and effective solution to confer the fire resistance function, despite the relative movements that can be observed between the turbojet and the mounting structure, during the different flight phases of the aircraft For example, FIGS. 5 and 5a to 5c show different compression levels of the first lip 52a, as a function of the relative position between the turbojet and the mounting structure. These figures show that the device 50 is fixed by means of bolt or rivet type attachment elements 54. These elements 54 pass through an attachment portion 56 of the device 50, and a first support 58 of the connection cowling 30, located radially inwards between the connection fairing and the peripheral bearing surface 46. The first support 58 has a generally U shape open laterally outwards. The device 50 also comprises a first connection portion 60a in the general form of an angle, from which the attachment portion 56 extends upwards along the Z direction. The hollow defined between this attachment portion 56 and the upper leg of the angle 60a, houses the lower corner of the U of the first support 58.

Figure 5:
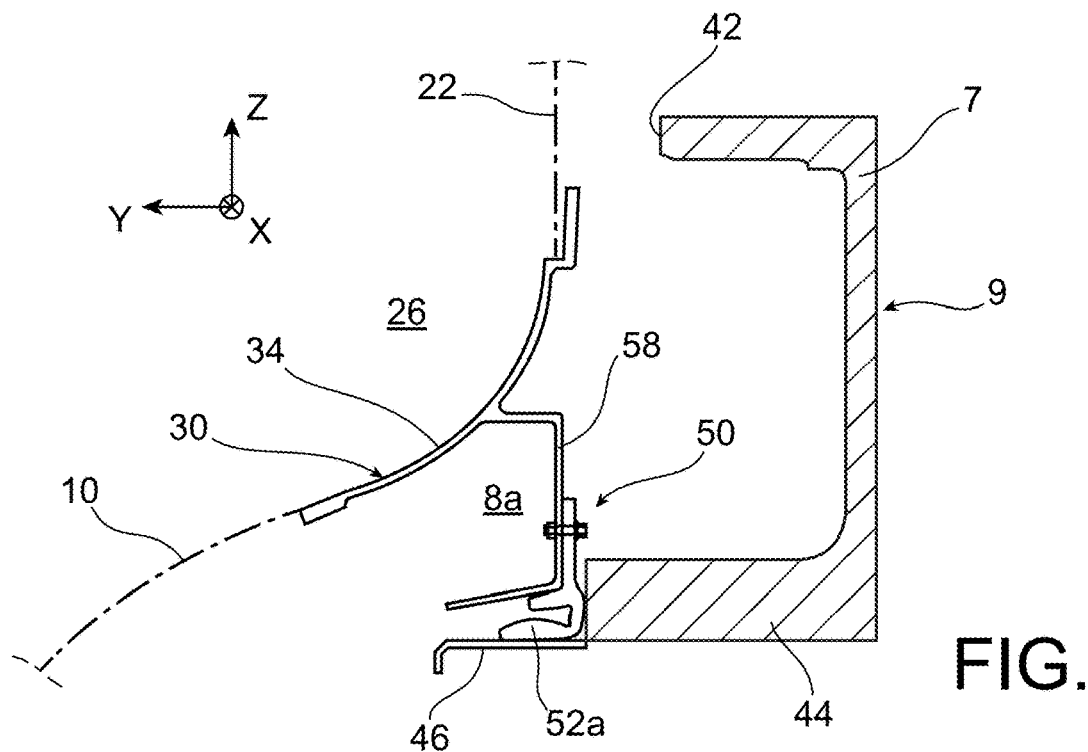
FIG. 5 is a sectional view taken along line V-V in FIG. 4.
Figure 5A:
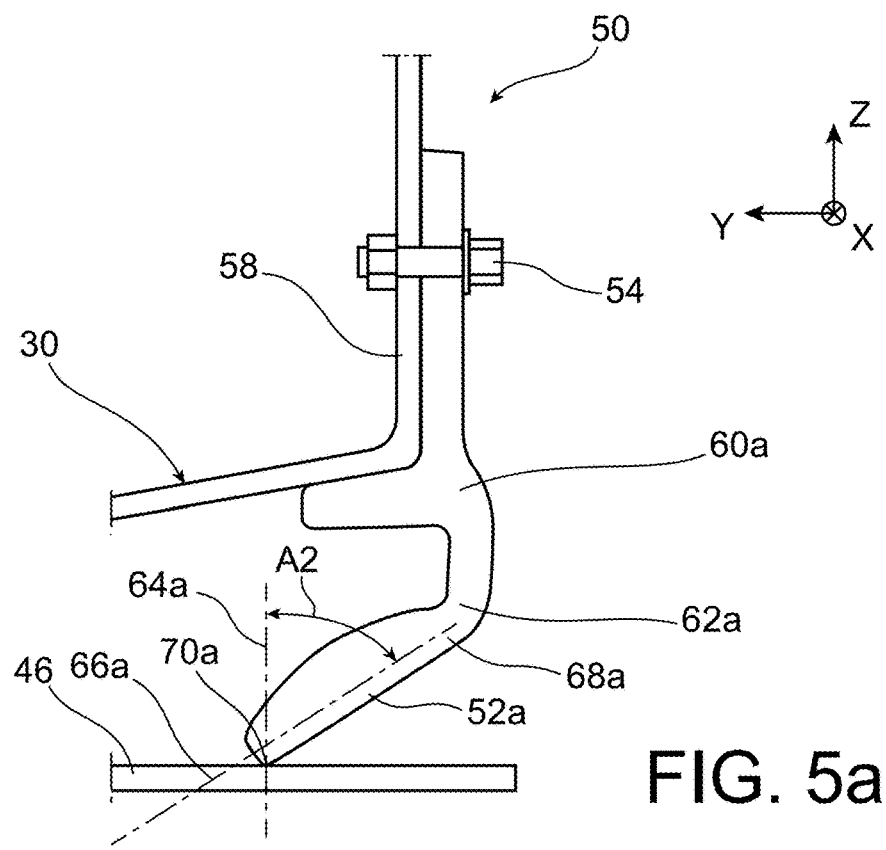
FIGS. 5*a*, 5*b*, 5*c* show enlarged sectional views of the fire resistance device shown on the preceding figure, in different states of compression.
Figure 5B:
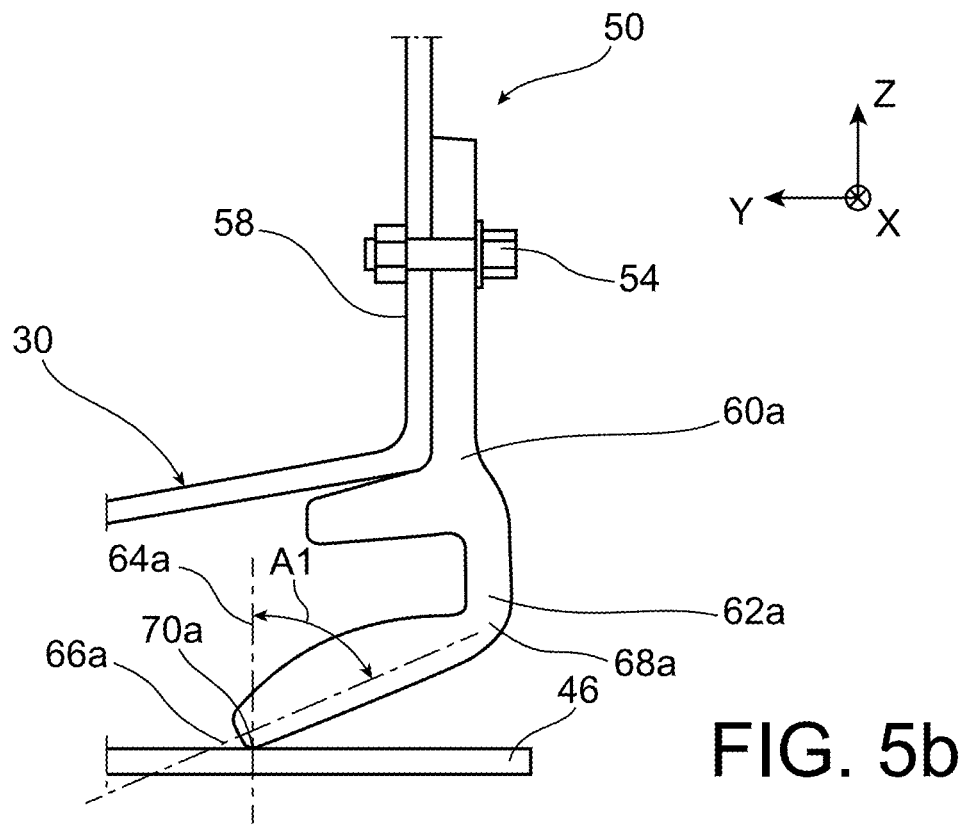
Figure 5C:
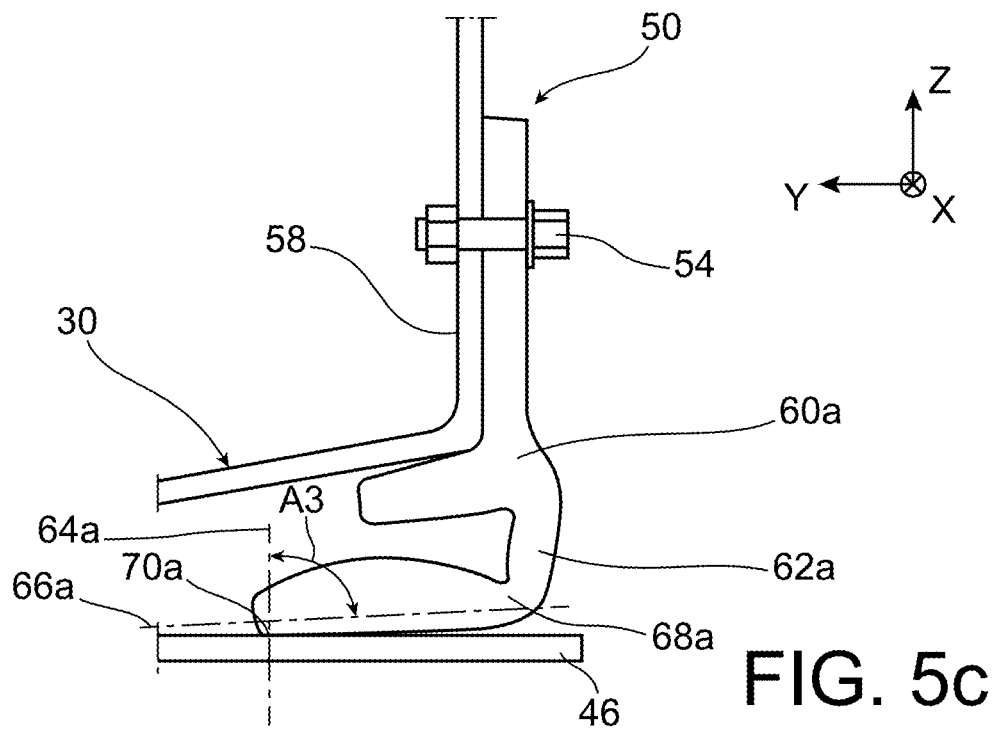

The lower leg of the angle 60a is prolonged by a first junction zone 62a that makes the transition with the first contact lip 52a. This junction zone 62a, possibly with reduced thickness, acts as a hinge for the lip 52a that preferably remains straight and is not deformed or is only slightly deformed in bending, regardless of the degree of compression applied. The shape of this lip 52a resembles a curved ledge at its radially external surface, opposite its radially internal surface facing the peripheral bearing surface 46 and having a substantially plane shape. FIGS. 5 and 5b show a nominal compression level of the device 50 in the Z direction, with an angle of inclination A1 between the normal 64a to the contact surface of the peripheral bearing surface 46, and a first general direction of the lip 66a defined between a base 68a of this first lip 52a, and a first contact end 70a of this lip. When the compression level reduces as shown diagrammatically on FIG. 5a, the angle A2 between the normal 64a and the general direction of the lip 66a is smaller, while when the compression level increases as shown diagrammatically on FIG. 5c, the angle A3 between the normal 64a and the general direction of the lip 66a is larger. This angle can be as large as 90°. In all cases, the strain level of the first junction zone 62a forces the lip 52a to adapt to different angles from the normal 64a, it being repeated that this lip 52 remains rigid and is only slightly deformed or not deformed in bending.

The design of the fire resistance device 50 is such that contact between the first lip 52a and the peripheral bearing surface 46 can be maintained regardless of relative movements observed between the turbojet and the mounting structure, along each of the three directions X, Y and Z.

Figure 6:
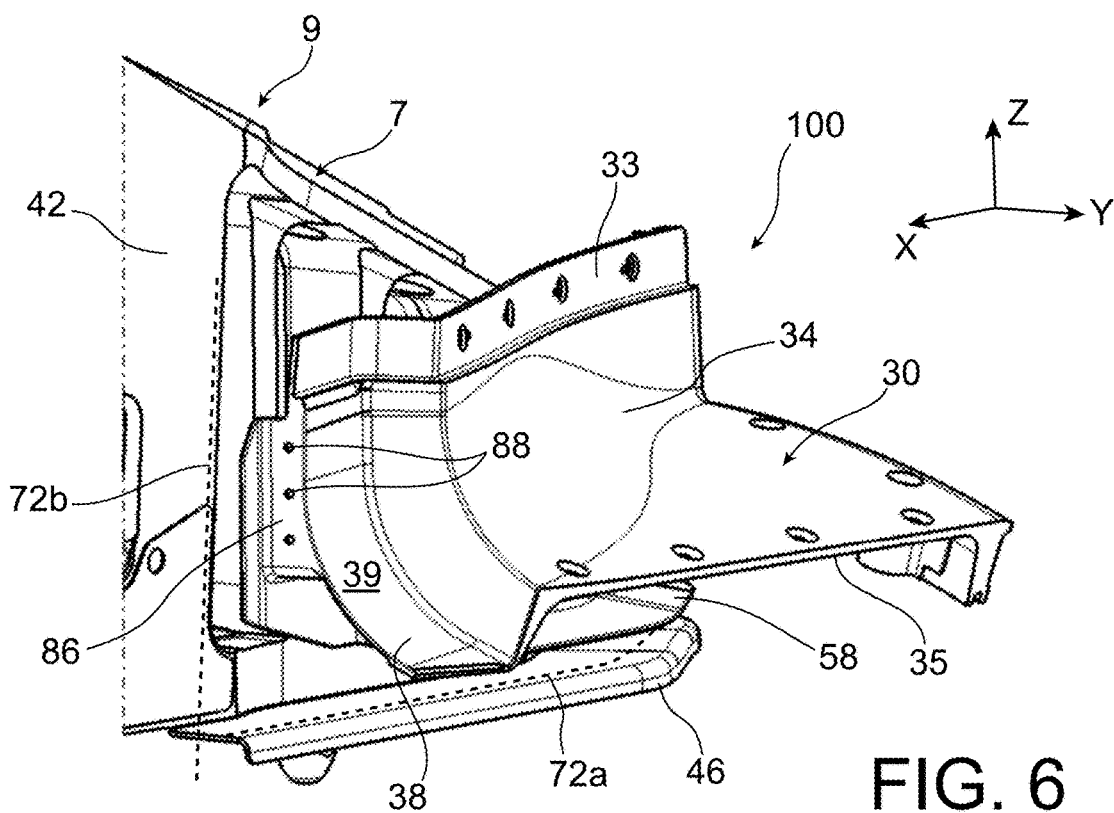
FIG. 6 is a perspective view of the part shown on FIGS. 2 to 4, diagrammatically showing the seal line obtained by means of the fire resistance device.
Figure 7:
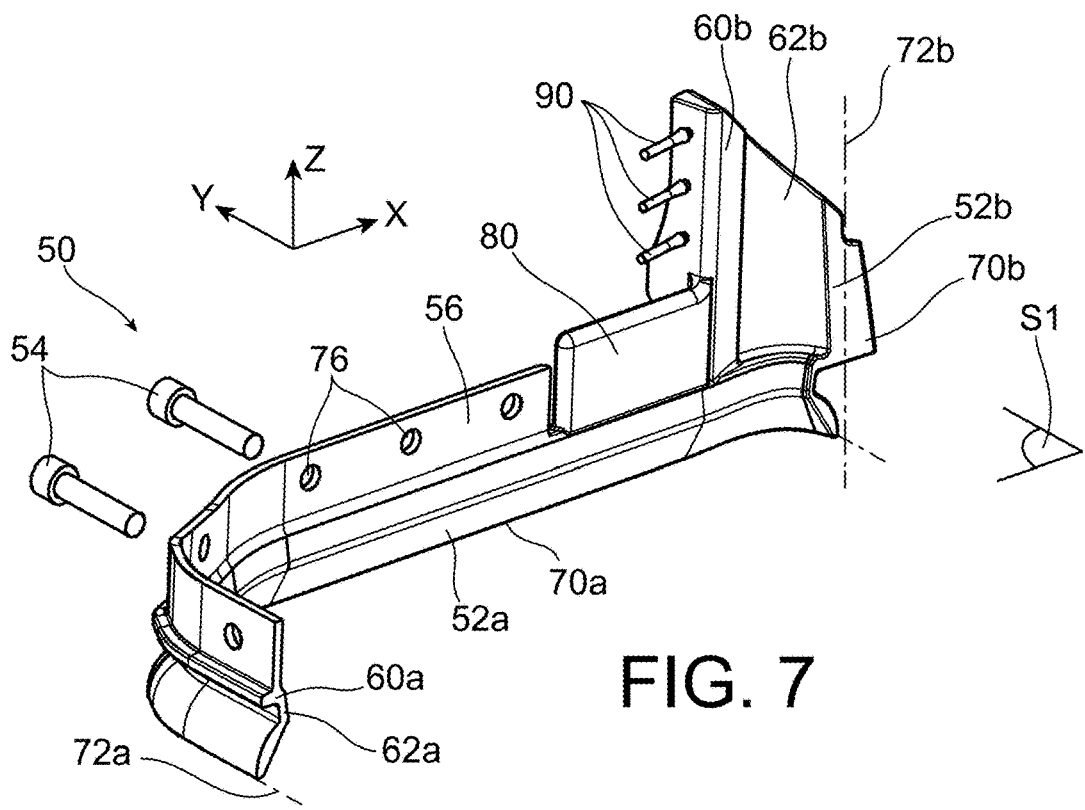
FIGS. 7 to 9 are perspective views of the fire resistance device shown on the preceding figures, represented at different viewing angles.
Figure 8:
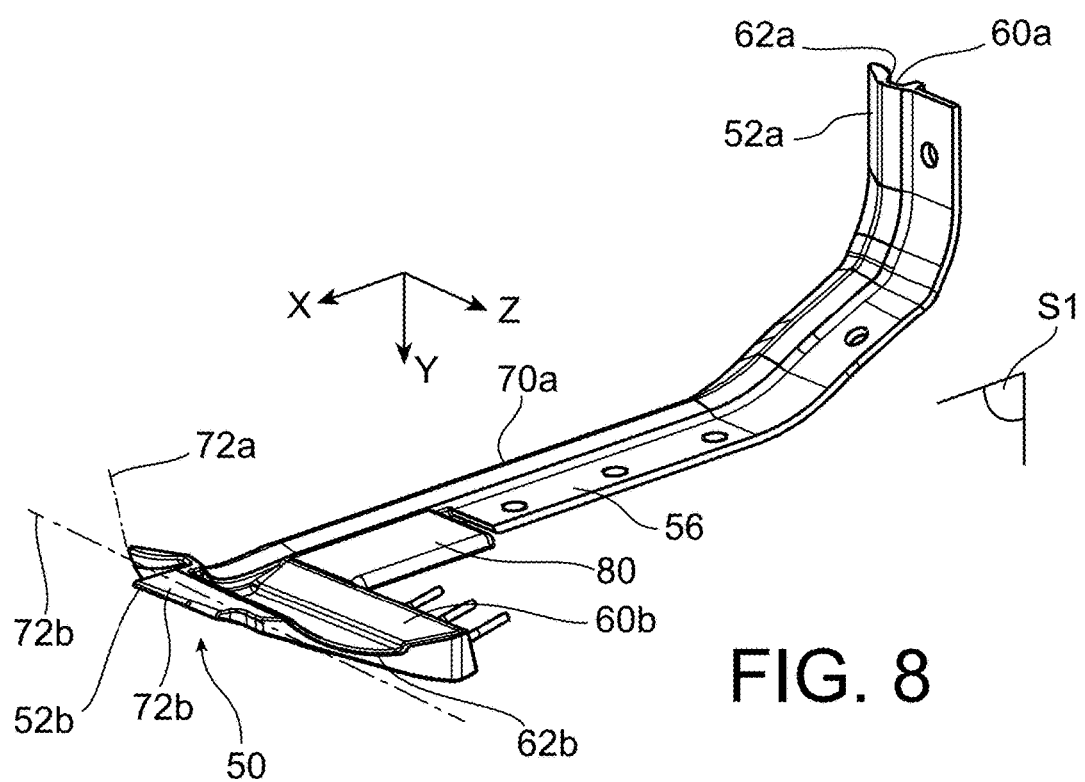
Figure 9:
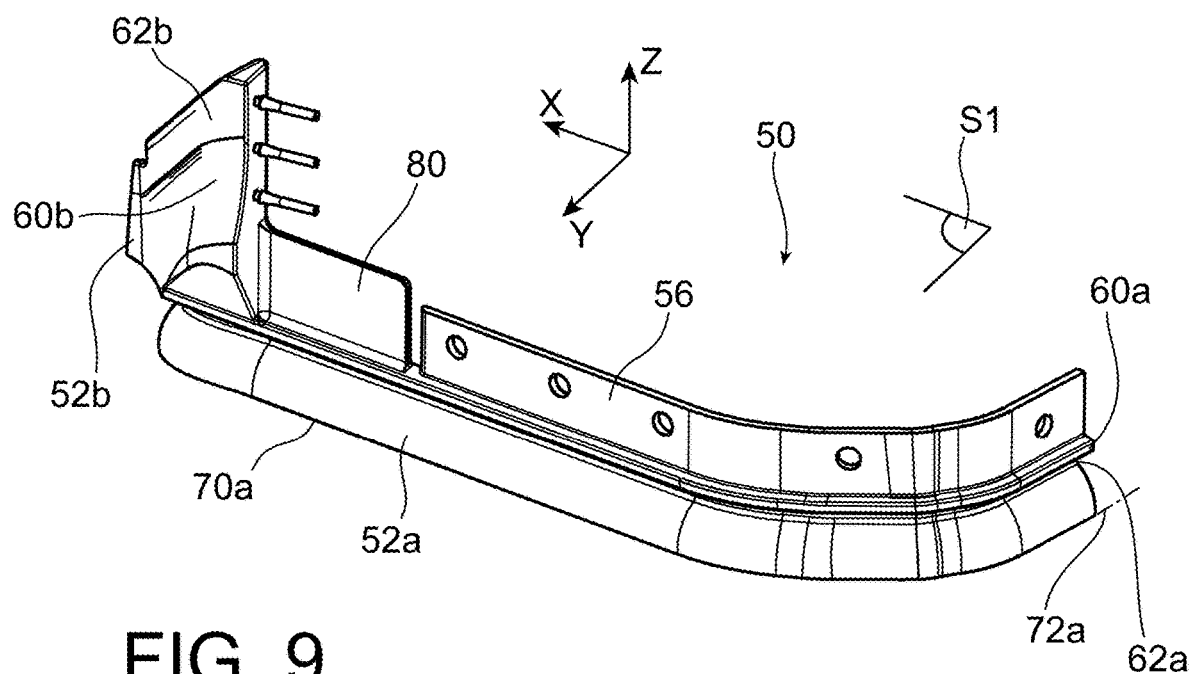

Concerning the first contact lip 52a, this lip sets up a first sealing line along the peripheral bearing surface 46, as represented on FIG. 6. It is a first curved line 72a, following the profile of the half-bearing surface portion 46 associated with the lip 52a. The first contact end of this lip 52a (not represented on FIG. 6) extends along this first generally L-shaped curved line 72a. One of the specific features of the invention lies in the fact that the device 50 therefore integrates the above-mentioned second lip, the function of which is to establish a second sealing line 72b on the lateral face 42 of the mounting structure 9. This second line is preferably straight, substantially parallel to the Z direction. Preferably, the two lines 72a, 72b join together at a radially internal downstream end of the device 50. Although the two lips can be directly contiguous, they can alternatively be connected by the first support portion 60a as shown on FIGS. 7 to 12 showing the device 50 in more detail. In particular, one end of the device 50 along the first curved line 72a can be formed by one end of the two lips 52a, 52b and by one end of the support portion 60, both arranged substantially in the same plane.

FIGS. 7 to 12 represent firstly the first contact lip 52a, its first contact end extending along the first curved sealing line 72a, the angle-shaped first support portion 60a, and the first junction zone. All elements 52a, 60a, 62a extend along the entire length of the fire resistance device 50, parallel to the first curved line 72a. This is inscribed in a first substantially plane contact surface S1, that corresponds to the radially external surface of the peripheral bearing surface 46. This surface S1 can be strictly plane, or it can have one or several very low height levels, for example not exceeding a few millimetres. The surface S1 thus preferably corresponds to an XY plane of the propulsion assembly 100. Furthermore, as can be seen on the figures, the first curved line 72a that is inscribed in this XY plane and within which the first lip 52a extends, has a general L-shape in which the angle between the base of the L and the leg of the L can be rounded, and in which the free end of the leg can also be rounded.

On only part of the first support portion 60a, the attachment portion 56 extends upwards along the Z direction, in the form of a ledge in which passage holes 76 are perforated for the passage of the above-mentioned bolts. This first attachment portion 60a extends along the base of the L and along most of its leg. The passage holes 76 can be reinforced by inserts 77 added onto the device 50 later, as represented on FIG. 12.

On the other part of the leg of the L formed by the first attachment portion 60a, a second support portion 60b also extends upwards substantially along the Z direction. More precisely, this second support portion 60b has a greater thickness that extends upwards starting from an external radial end of the first support portion 60a, in other words from the upper leg of the angle. To reinforce the mechanical strength of the device 50, there is a rib 80 interposed between the attachment portion 56 and the second block-shaped support portion 60b. This rib 80 also extends upwards substantially along the Z direction, parallel to the attachment portion 56 from which it can be separated, along the direction of the first curved line 72a. The thickness of the rib 80 is intermediate between the thickness of the attachment portion 56, and the thickness of the second support portion 60b. The same applies for its height along the Z direction. The function of the second support portion 60b is to carry the second lip 52b through a second junction zone 62b interposed between them. The thickness of the second junction zone 62a is reduced, and it acts as a hinge for the second lip 52b that preferably remains straight and is not deformed or is only slightly deformed in bending, regardless of the degree of compression applied.

The second junction zone 62b extends not only downstream from the second support portion 60b substantially along the X direction, but also upwards from the upper leg of the angle 60a, substantially along the Z direction. At its downstream end, it carries the lip 52b, the second contact end 70b of which extends along the second preferably straight line 72b, and preferably substantially orthogonal to the first contact surface S1. Thus, the second straight line 72b extends substantially along the Z direction, so that the lip 52b is in contact with the associated lateral face of the mounting structure.

Figure 10:
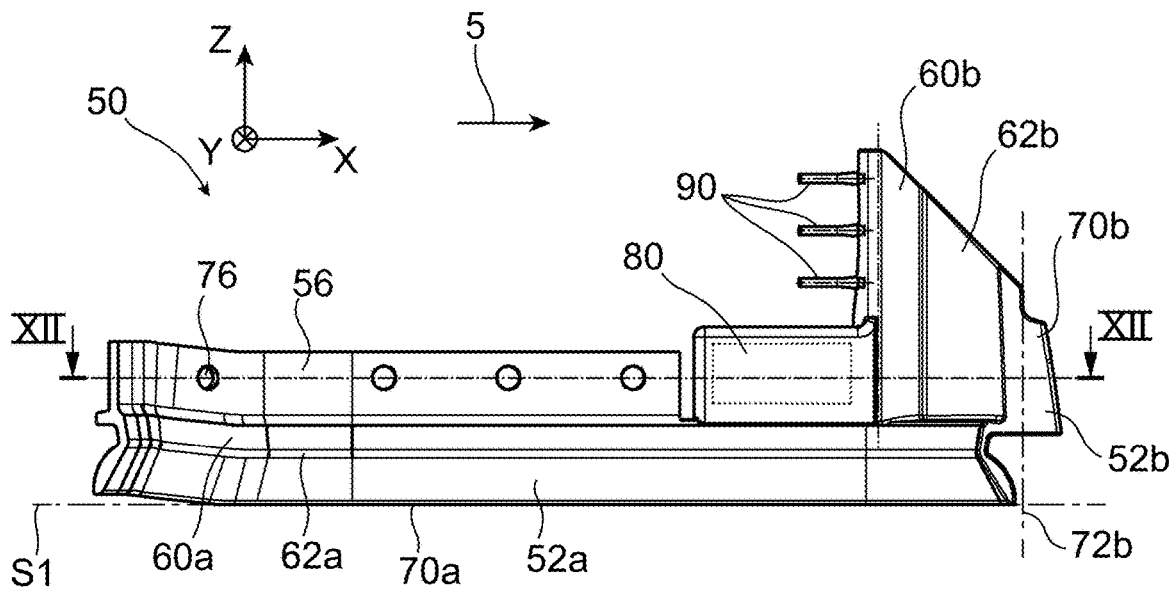
FIG. 10 is an elevation view of the fire resistance device shown on FIGS. 7 to 9.

The external radial end of the assembly formed by the elements 60b, 62b and 52b is bevelled, as can best be seen on FIG. 10.

Figure 11:
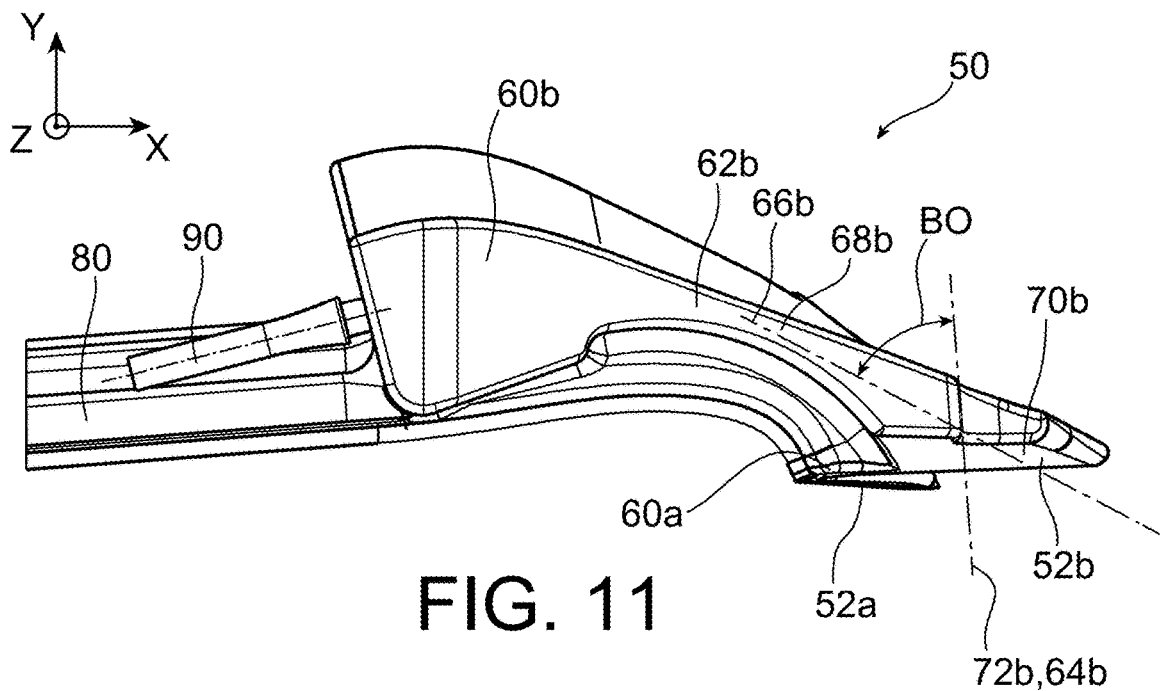
FIG. 11 is a top view of part of a part of the fire resistance device shown on the preceding figure.

Furthermore, the thickness of the second contact lip 52b increases with increasing distance from its base 68b referenced on FIG. 11, towards the second contact end 70a. Consequently, the second contact end may be two-dimensional, for example in the form of a vertical strip. In the unconstrained state represented on this FIG. 11, an angle of inclination B0 can be observed between a normal 64b to the lateral face of the mounting structure (not represented), and a second general lip direction 66b defined between a base 68b, and the second contact end 70b of the lip 52b.

Figure 15:
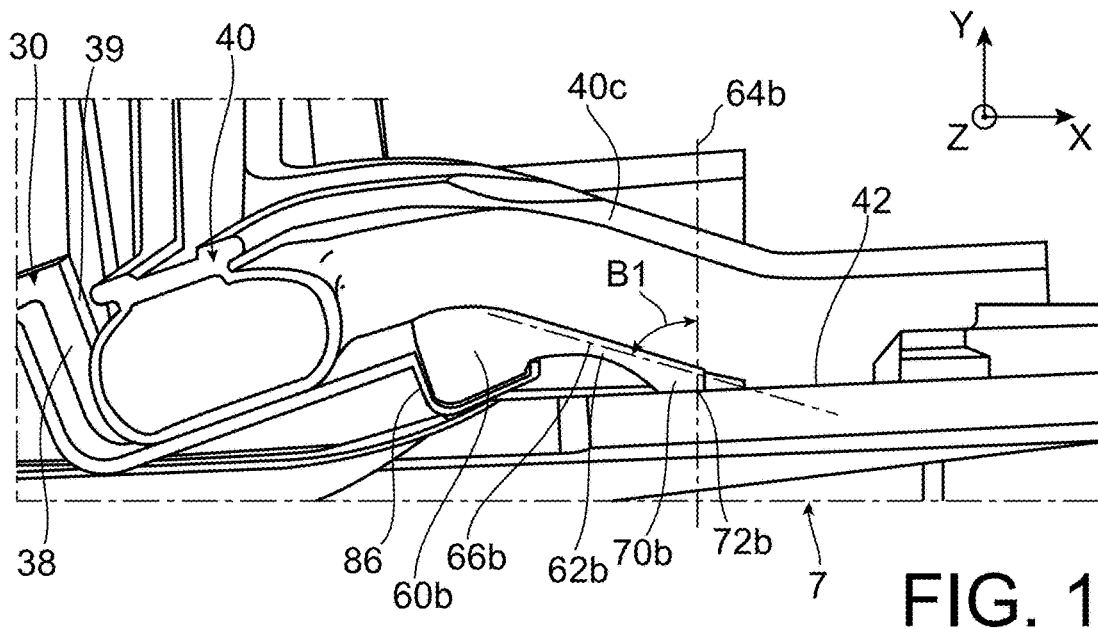
FIG. 15 represents an enlarged top view of the part shown on FIGS. 2 to 4, showing in particular the second contact lip of the fire resistance device.
Figure 16:
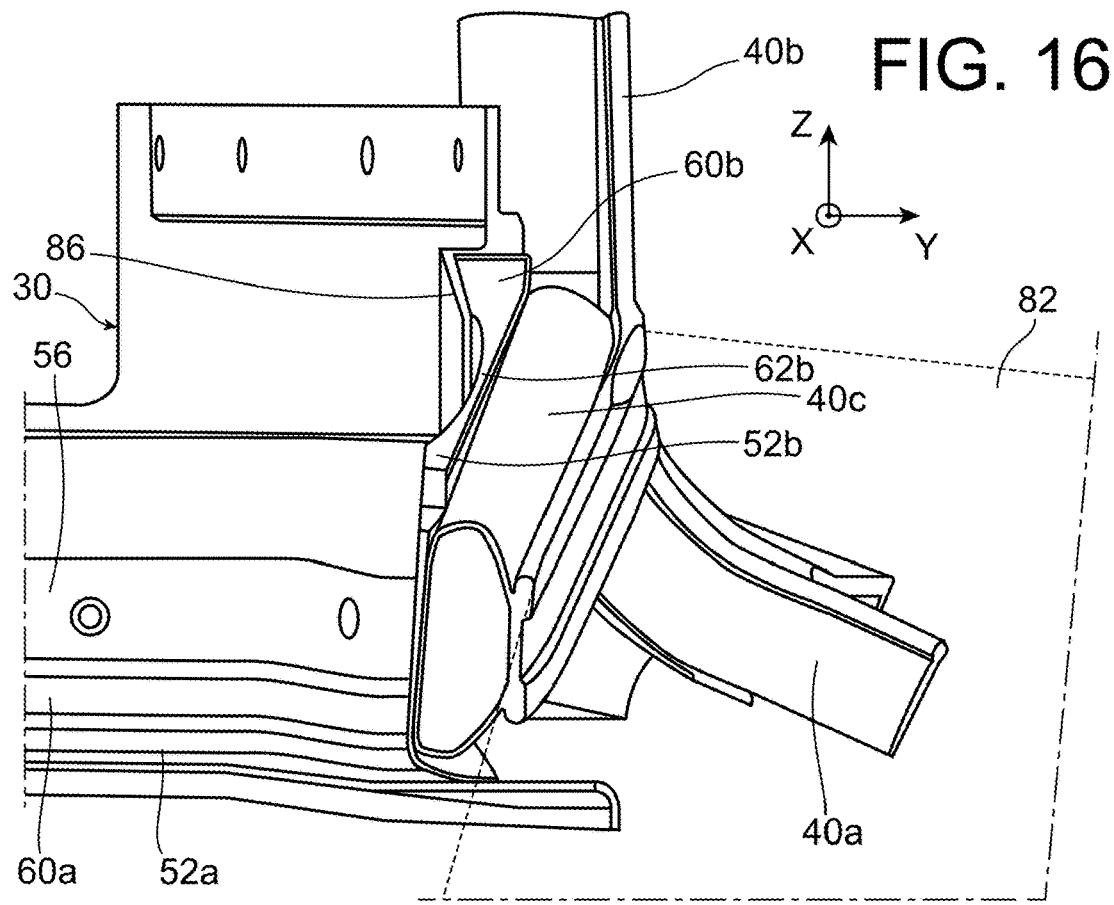
FIG. 16 represents a front view of the view shown on the preceding figure.

In the assembled state of the device 50, its second contact lip 52b is stressed along the Y direction by the third portion 40c of the pod seal. With reference to FIGS. 15 and 16, when the pod cover 82 (represented diagrammatically only on FIG. 16) is closed, the third leg 40c of the seal 40 fixed to this cover bears on the second lip 52b. The latter is then constrained between the lateral face 42 of the mounting structure and the third portion 40c of the seal 40, implying pivoting of the lip 52b in its second junction zone 62b. Due to this pivoting, the angle B1 between the normal 64b and the second general lip direction 66b is more than the above-mentioned angle B0. The value of this angle B1 then depends on the degree of compression of the fire resistance device 50, that itself depends on the amplitude of relative movements between the turbojet and the mounting structure. FIGS. 15 and 16 also show that the third portion 40c of the seal 40 is stressed along the Y direction, implying that its tubular sealing part is deformed between the pod cover 82 and the lip 52b. Thus, the tubular part that has a substantially circular section in the unstressed state, is flattened under the stress, for example to take on an elliptical or similar shape.

These FIGS. 15 and 16 show that the second support portion 60b of the device 50 fits into a second support 86, provided on the connection cowling 30, at its downstream end 38 forming the seal housing 39. The second support 86, that is best seen on FIG. 6, is provided with holes 88 through which elongated attachment elements 90 will pass, supported by the support portion 60b, on the side opposite the side on which the lip 52b and its second junction zone 62b are located. These elongated elements 90, referenced particularly on FIG. 10, are made in a single piece with the device 50, or are added onto this device 50. For example, they may be formed by rods, the end of which will be compressed on the surface opposite the second support 86 through which they pass.

Another specific feature of the invention lies in its preferably single-piece manufacturing of the fire resistance device 50. In other words, all the above-mentioned elements of the device 50 are made in a single-piece, preferably by compression moulding. This single-piece part may possibly include the elongated attachment elements 90, while the inserts 77 are considered to be add-on elements external to the device because they form part of its attachment means to the connection cowling 30.

For manufacturing of the device 50, the device may be a simple elastomer block, but this block will preferably be combined with one or several layers with different functions.

Figure 12:
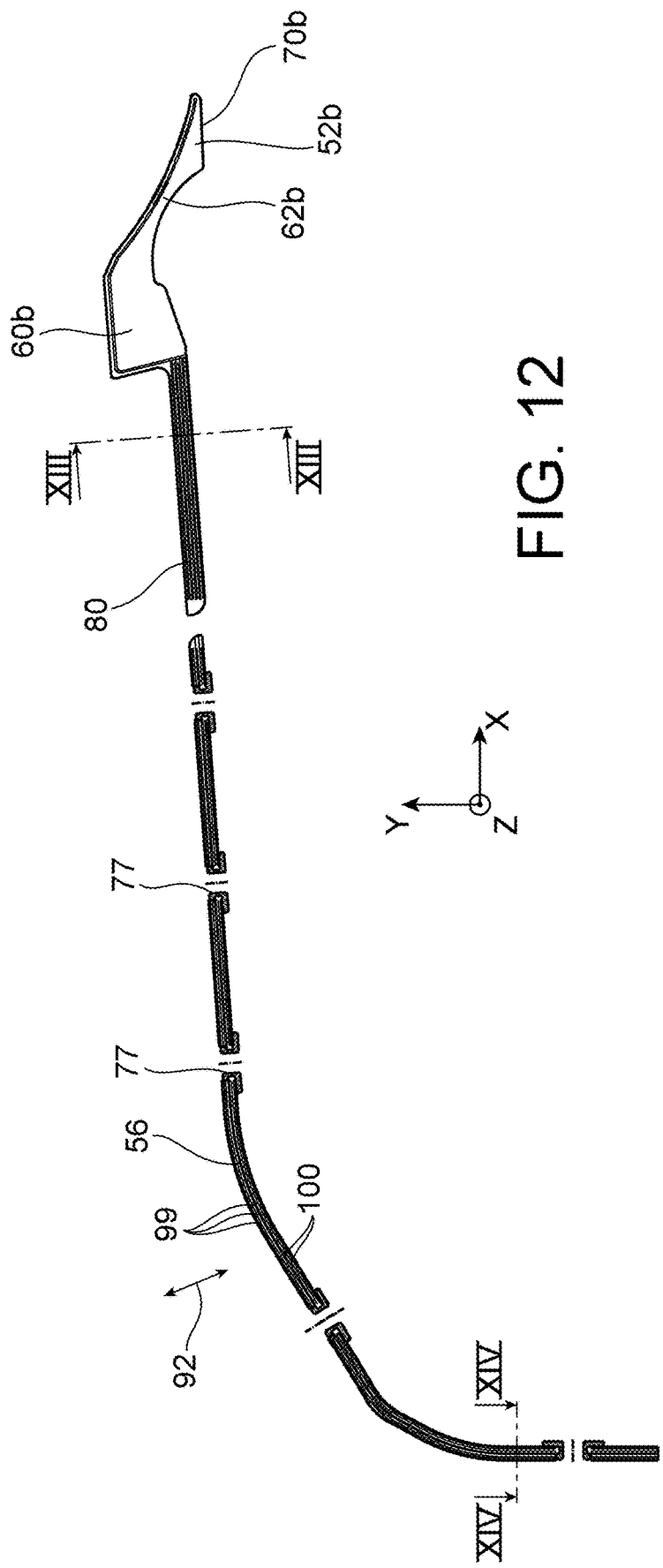
FIG. 12 is a sectional view taken along line XII-XII on FIG. 10.
Figure 13:
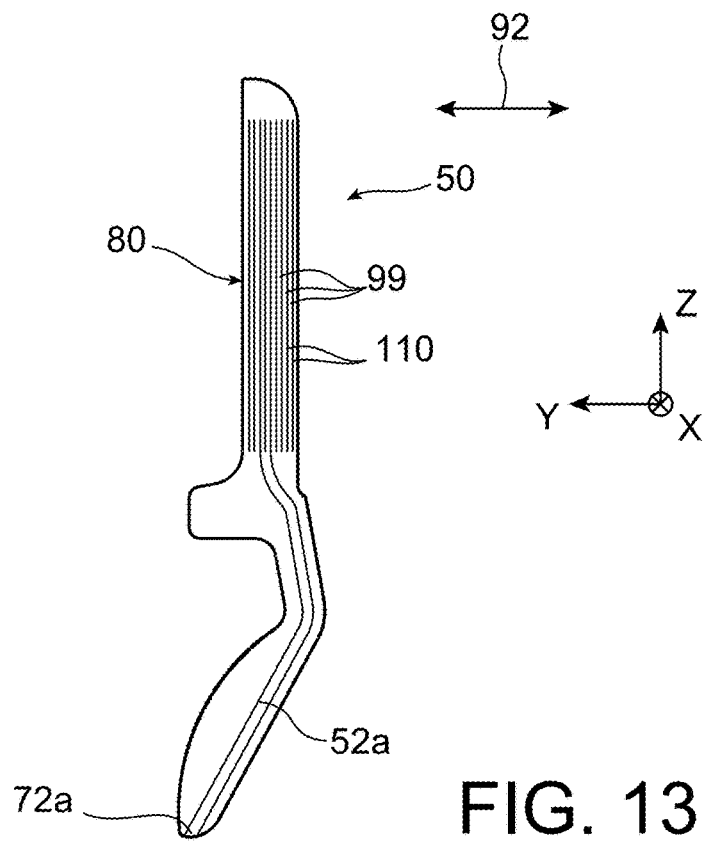
FIG. 13 is a sectional view along line XIII-XIII on FIG. 12.
Figure 14:
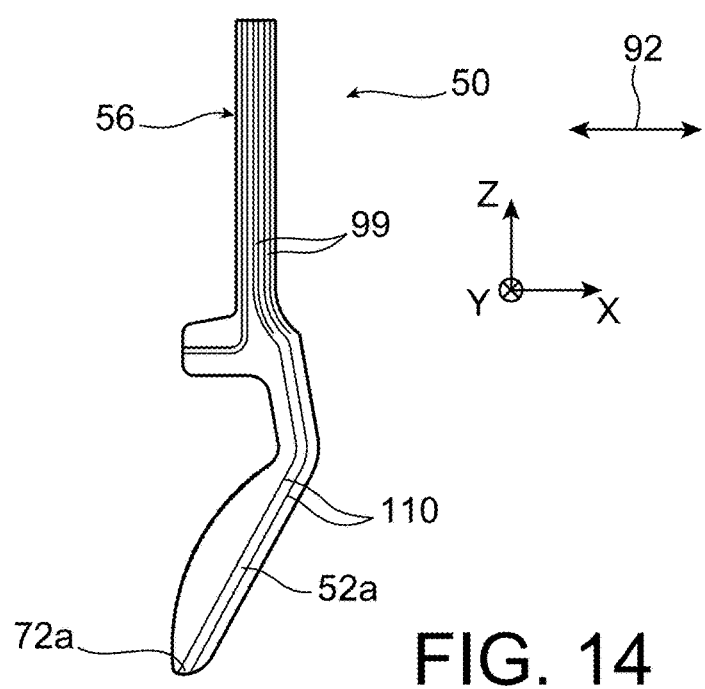
FIG. 14 is a sectional view along line XIV-XIV on FIG. 12.

In the example represented on FIGS. 12 to 14, the device 50 is formed by the superposition of layers made of an elastomer material 99 and preferably a silicone elastomer material, and fibrous functional layers 110, along the direction of the thickness of the device 50. These layers may include glass fabric layers that reinforce the stiffness of the device. Specific fire resistance layers can then be included, for example made of ceramic fibre. Preferably, they are arranged in the zones of the device most exposed to the flame. Since the silicone elastomer material of the layers 99 degrades into silica in the presence of severe heat, the mesh of the fabrics 110 used can retain these degraded particles.

The alternation of layers can be completed by fibrous meta-aramid layers 110, always to reinforce the stiffness of the assembly. One of the layers could even be coated on the external surface of the lips, to limit wear and damage due to parts in contact.

The layers 99 and 110 are preferably parallel to each other, along the profile of the device 50. At least one or several of these layers can extend over the entire height of the device 50, and from one end of the device to the other along the direction of the above-mentioned first curved line 72a.

The length of the device 50 along the X direction can be between 30 and 50 cm, whereas the width of this device along the Y direction is of the order of 10 to 20 cm. Finally, the maximum height of the device 50 along the Z direction can be of the order of 15 to 20 cm. Each lip 52a, 52b only extends over a few centimetres along its general lip direction.

Concerning fire resistance conferred by the device 50, in addition to complying with the requirements of standards ISO 2685-1998 and AC 20-135, the most severe conditions are considered, namely resistance to fire in flight and resistance to fire on the ground. In particular, this implies the design of a solution to perform the fire resistance function under the following conditions:

flame temperature: 1100±80° C.;
vibration: ±0.4 mm at a frequency of 50 Hz;
pressure: 0.4 bars during the first 5 minutes of the fire test;
test duration: 15 min, broken down into 2 phases:
5 min: Applied positive pressure; and
10 min: Atmospheric pressure;
self-extinction within a limited time.

Obviously, an expert in the subject can make various modifications to the invention as it has just been described solely through non-limitative examples, within the scope defined by the appended claims.

What is claimed is:

1. A propulsion unit for an aircraft comprising a dual flow turbine engine for the aircraft, and a turbine machine attachment mounting structure for use in fastening the dual flow turbine engine to a wing element of the aircraft,
    the turbine engine comprising an inter-flow compartment formed between a core engine flow and a fan flow of the turbine engine, and an arm passing radially through the fan flow, and communicating with the inter-flow compartment that is partly delimited radially outwards by an upstream ring connected to the arm by means of two connection cowlings arranged with one on each side of an upstream end of the mounting structure, along a transverse direction of the propulsion unit,
    the upstream end of the mounting structure comprising two lateral faces, and a peripheral bearing surface along a contour of a base of the upstream end of the mounting structure,
    wherein the propulsion unit comprises a fire resistance device designed to be interposed between the upstream end of the mounting structure of the aircraft dual flow turbine engine, and one of the two connection cowlings installed on the turbine engine, said two connection cowlings being designed to connect the upstream ring delimiting part of the inter-flow compartment radially outwards, to the arm passing radially through the fan flow stream of the turbine engine, wherein the fire resistance device comprises:
    a first support portion;
    a first contact element being carried by the first support portion through a first junction zone, and having a first contact end extending along a first curved line;
    a second support portion extending from an end portion of the first support portion; and
    a second contact element being carried by the second support portion via a second junction zone that also extends from the end portion of the first support portion, the second contact element having a second contact end extending along a second line distinct from the first line.

2. The propulsion unit according to claim 1, wherein the fire resistance device is a single-piece.

3. The propulsion unit according to claim 1, wherein said second line is straight.

4. The propulsion unit according to claim 3, wherein said second line is substantially orthogonal to a first substantially plane contact surface in which the first curved line is inscribed.

5. The propulsion unit according to claim 1, wherein the first support portion has the general shape of an angle.

6. The propulsion unit according to claim 1, further comprising an attachment portion extending from the first support portion.

7. The propulsion unit according to claim 5, wherein said attachment portion contains through holes for the passage of attachment elements.

8. The propulsion unit according to claim 1, wherein the second support portion carries elongated attachment elements, opposite the second contact element and the second junction zone.

9. The propulsion unit according to claim 1, wherein the device is formed by superposition of at least one layer of elastomer material and at least one fibrous layer.

10. The propulsion unit according to claim 9, wherein the elastomer material is a silicone elastomer material.

11. The propulsion unit according to claim 9, wherein the at least one fibrous layer is made of ceramic, glass or meta-aramid.

12. The propulsion unit according to claim 1, wherein the first contact end of the first contact element bears on the peripheral bearing surface of the upstream end of the mounting structure, and in that the second contact end of the second contact element bears on the corresponding lateral face of the upstream end of the mounting structure.

13. The propulsion unit according to claim 1, wherein the first curved line is inscribed in a first approximately plane contact surface substantially parallel to the transverse direction, and to a longitudinal direction of the propulsion unit, and in that the second line defined by the second contact element is a straight line extending approximately parallel to a vertical direction of the propulsion unit.

14. The propulsion unit according to claim 1, wherein the second contact element is constrained between the corresponding lateral face of the upstream end of the mounting structure, and a seal of a pod mobile cover.

15. A method of manufacturing the propulsion unit according to claim 1, wherein the fire resistance device is made in a single-piece.

16. The method according to claim 15, wherein the fire resistance device is moulded.

17. The propulsion unit according to claim 1, wherein the first contact element is formed by a first contact lip.

18. The propulsion unit according to claim 1, wherein the second contact element is formed by a second contact lip.

\* \* \* \* \*